Jan. 26, 1954
E. M. MILLARD ET AL
2,667,117
ADJUSTABLE COLANDER FOR COOKING AND
SERVING VEGETABLES AND THE LIKE
Filed June 2, 1950
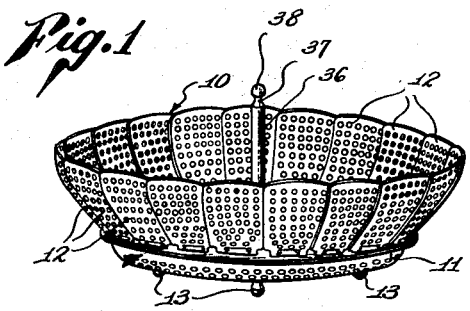
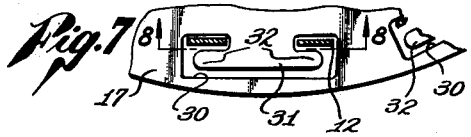
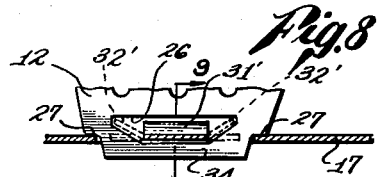
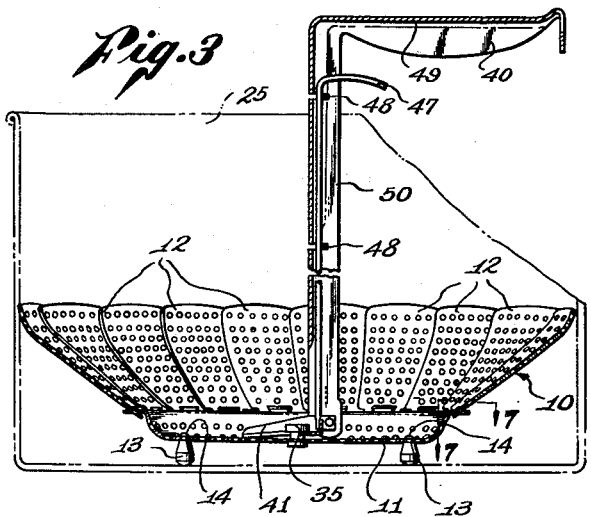
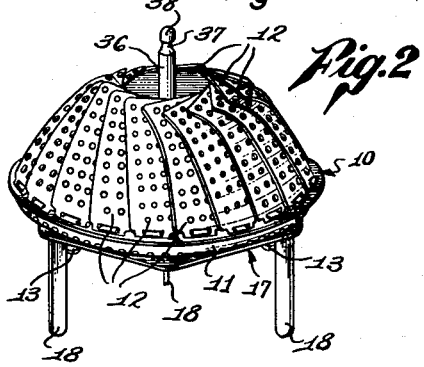
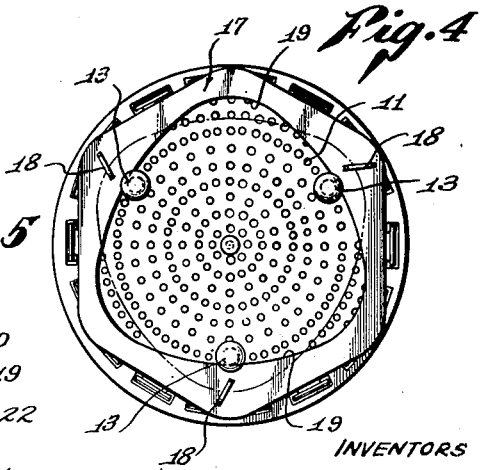
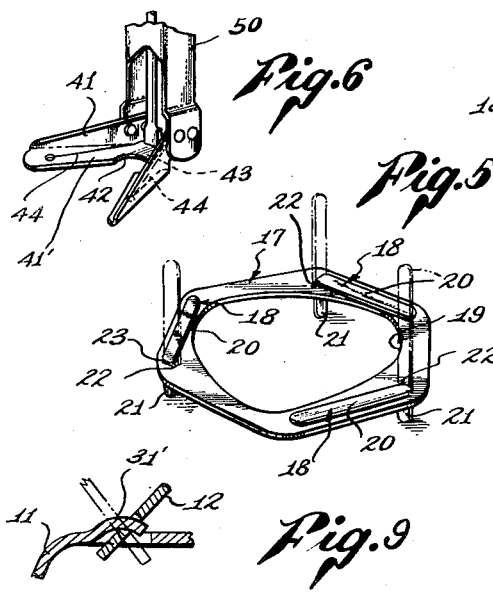
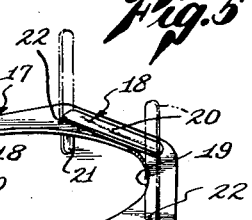
INVENTORS
EVERETT M. MILLARD
ALLAN L. TURNER
HENRY M. KURZ
MARJORIE L. DOCKERY
BY
Fulwider & Mattingly
Attorneys Patented Jan. 26, 1954

2,667,117

UNITED STATES PATENT OFFICE 2,667,117

ADJUSTABLE COLANDER FOR COOKING AND SERVING VEGETABLES AND THE LIKE

Everett M. Millard, Glendale, Allan L. Turner, San Fernando, Henry M. Kurz, Burbank, and Marjorie L. Dockery, Sun Valley, Calif.; said Turner, said Kurz, and said Dockery assignors to said Millard Application June 2, 1950, Serial No. 165,646

6 Claims. (Cl. 99—418)

The present invention relates generally to cooking utensils, and more particularly, to a colander-like inner receptacle which is adjustable to fit into various sizes of cooking receptacles and may also be used as a serving container.

Dietetic and medical research has shown that many of the health-giving and flavorful elements of foods, particularly vegetables, are lost when such foods are cooked in large quantities of water and the water discarded before serving. Accordingly, it is desirable, both from a standpoint of retaining health-giving vitamins, minerals, etc., and also from the standpoint of taste and appearance, to use a minimum amount of water in cooking vegetables and fruits. Particularly is this true in the case of quick-frozen products which have already been blanched and need only to be cooked for a relatively short time before serving. As a matter of fact, in the case of many vegetables and fruits that have been quick-frozen, it is unnecessary and undesirable to add any water at all for the cooking process, since it has been found possible to cook or steam the vegetables entirely in their own juices or in the liquid resulting from the melting of the ice and frost on the frozen produce.

In cooking food products in the manner just described, however, care must be taken to keep the material being cooked out of direct contact with the bottom of the cooking vessel so as to prevent scorching due to the boiling away of moisture at points where the produce actually contacts the cooking vessel. It has been the practice in the past to employ various perforated colanders, false bottoms, and the like, to support material being cooked away from the bottom of the cooking vessel. These devices have been, of necessity, constructed for use in one particular vessel in which they fit closely enough to prevent food from dropping down around the edges of the supporting surface and against the bottom surface of the outer vessel itself. False bottoms as separable pieces are usually provided in pressure cookers for similar reasons.

The disadvantage in such previous devices has been that they are adaptable for use with one particular vessel only, and if it is desired to cook in a smaller or larger vessel, a different and separate inner member must be provided. Furthermore, past utensils of the type described have not been provided with convenient means for lifting the internal colander or food-supporting member out of the cooking vessel to remove the food therefrom.

Bearing in mind the above desiderata and the disadvantages of previous constructions it is a major object of the present invention to provide a food-supporting utensil for use in cooking vessels of various types and sizes for holding the food being cooked out of contact with the bottom of the cooking vessel.

It is another object of the invention to provide an article of the class described which may also be used as a serving vessel for serving the food previously cooked therein.

Still another object of the invention is to provide in a utensil of the class described, convenient lifting means for removing the same from the cooking vessel, together with the contents thereof.

Yet another object of the invention is to provide a utensil of the type described which is adjustable not only in diameter to fit various diameters of cooking vessels, but is also provided with adjustable legs or supports whereby it may be held in the cooking vessel at various distances above the bottom, depending upon the amount of space desired therein.

The foregoing and additional objects and advantages of the invention will be apparent from consideration of the following detailed description thereof, as embodied in an adjustable cooking-serving colander, such consideration being given likewise to the attached drawings, in which:

Figure 1 is a perspective view of the colander embodying the invention, the same being shown in open position ready for use in a relatively large cooking vessel;

Figure 2 is a perspective view of the article shown in Figure 1, the same being shown in a closed position as for storage, and also showing an adjustable support member attached thereto;

Figure 3 is an elevational medial section taken through a modified form of the article shown in Figure 1 in position in a cooking vessel, and also showing a lifting handle engaged with the colander;

Figure 4 is an enlarged bottom plan view of the device shown in Figure 2;

Figure 5 is a perspective view of a leg-carrying member employed in the device shown in Figures 2 and 4;

Figure 6 is an enlarged fragmentary perspective view of the lower end of the lifting handle shown in Figure 3;

Figure 7 is an enlarged fragmentary horizontal section taken on the line 7—7 in Figure 3;

Figure 8 is a fragmentary elevational section taken on the line 8—8 in Figure 7; and Figure 9 is a fragmentary elevational section taken on the line 9—9 in Figure 7.

In the drawings, the device is indicated generally by the reference character 10, and it will be seen to comprise in general a circular foraminous bottom member 11, having secured around its periphery a number of overlapping hingedly movable leaves 12. The bottom member 11, the leaves 12, in fact, all of the parts of the device may be constructed of various corrosion-resistive metals, such for example, as stainless steel, aluminum, chromium plated metals, or the like. The presently preferred material is stainless steel, although it will be realized that other materials may be used without departure from the spirit of the invention.

The bottom member 11 is generally dish-shaped, as can be seen best in Figure 3, and is provided with three stud-like feet 13 which may be conveniently attached by providing a shouldered upper portion which may project through one of the perforations in the bottom member 11, and be riveted over, as indicated at 14 in Figure 3.

The feet 13 are formed with inwardly tapering, conical portions whereby they may serve to secure a leg-carrying member 17 and three foldable legs 18 carried thereby to the bottom of the unit 10, as shown in Figures 2 and 4. As seen best in Figure 4, the leg carrier 17 comprises a flat, generally ring-shaped member having a hexagonal exterior (although not necessarily so) and a generally three-lobed, cam-shaped interior edge 19. It will be noted that the interior edge 19 forming the aperture in the leg carrier 17 is roughly three-cornered so that by rotating the same to the proper orientation with respect to the studs or legs 13, the leg carrier 17 may pass over the three legs 13 to be secured to the bottom of the utensil 10 by thereafter rotating the same to cause the legs 13 to cam against the interior edge 19, as shown in Figure 4.

Removal of the leg carrier 17 is accomplished by reversing the procedure, i. e., by rotating the member 17 in the opposite direction, thus loosening the edge 19 from its engagement with the legs 13, and continuing rotation until the "corner" portions or lobes of the cam edge 19 are opposite the legs 13 whereupon it may be removed therefrom. It will be recognized that the conical shape of the legs 13 causes the leg carrier 17 to be pressed snugly against the bottom member 11 when the member 17 is rotated to cam the same, as aforesaid.

The three leg members 18 each consist of a flat strap of sheetmetal bent into an L-shape to form one relatively long leg 20 and one short leg 21. The leg members 18 are hingedly supported in the carrier 17 by projecting through three slots 22 therein, each of the leg members 18 having a notch 23 in the edge at the point of the bend therein so as to retain the leg member 18 in the therein. Such retention is due to the fact that notch 23. The length of the slot 22 is such as to be a slight interference fit with the width of the leg member 20 so that when the latter is pressed through the slot 22, the end of the slot is deformed slightly until the notch 23 snaps into place, thus retaining the two parts together. Such carrying means also permit free folding of the leg members 18 from the position shown in dotted line in Figure 5 to the position shown in full line therein.

Thus, it will be seen that the utensil 10 may be supported at any one of three distances above its supporting surface, to wit, it may rest directly on the stud legs 13, thus providing a minimum spacing above the supporting surface; it may rest on the short legs 21 by attaching the leg carrier 17 with the legs folded in the position shown in full line in Figure 5, thus providing an intermediate spacing; or lastly, the leg carrier 17 may be removed, inverted, the leg members 18 folded to the alternate position and the leg carrier reattached with the long legs 20 extending downwardly as shown in Figure 2, thus providing the maximum spacing. The spacing selected will depend on the nature of the material to be cooked, the amount of water to be employed, if any, and the diameter of the outer vessel, as for example, 25 in Figure 3.

Turning now to the discussion of the means for attaching the leaves 12 to the periphery of the bottom member 11, reference is made to Figures 7, 8 and 9. Here it will be seen that the leaves 12 are foraminous, as is the bottom member 11, and are trapezoidal in shape, having a transverse slot 26 adjacent the smaller end, and also being notched at the lower corners to form shoulders 27 adjacent said end, with a downwardly projecting tab 34 therebetween.

As can be seen best in Figure 7, the flat rim-like projection of the bottom member 11 is formed with a number of circumferentially arranged elongated slots 30, each having a tongue 31 projecting thereinto from one side, and the tongue 31 being formed with laterally projecting lugs 32. The tabs 34 are inserted in the slots 30, as shown in Figure 8, and the slot 26 in the leaf 12 has outwardly sloping ends so that by bending the lugs 32 of the tongue 31 upwardly, as indicated by dotted line at 32' in Figure 8, the tongue 31 may be passed through the slot 26, the shoulders 27 of the leaf 12 resting on the upper surface of the bottom member 11, adjacent the ends of the slots 30. Thereafter, the lugs 32 may be flattened whereby they engage the leaf 12 and prevent it from being slipped off of the tongue 31.

As shown in Figure 9, the tongue 31 is arched upwardly as indicated at 31', so as to permit a hinging action of the leaf 12 between the positions indicated in full and phantom line in Figure 9.

The upper portions of the respective leaves 12 are curved both longitudinally and transversely so that the same cooperate with one another to form a petal-like structure, as shown in the drawings. The curvature of the leaves in a horizontal plane is such that they cooperate to form a relatively smooth outer curved surface thus to fit closely in a circular cooking vessel, such as 25.

Due to the fact that the leaves 12 all overlap each other in the same direction, movement of any one of the leaves results in corresponding movement of the remainder of these elements. Thus, the device may be quickly changed in diameter by merely pressing inwardly or pulling outwardly on any one of the leaves. When it is desired to fold the device into the smallest possible space, as for example, for storage, the leaves may be pressed inwardly to a limiting position illustrated in Figure 2, thus greatly reducing the space occupied by the device.

As previously stated, it is desirable to lift the entire utensil 10 from the cooking vessel 25, together with the contents of the inner utensil or liner member 10. To this end, we have provided alternate means for lifting the device which are illustrated in Figures 1 and 3, respectively.

As seen best in Figure 3, a hollow interiorly threaded bushing 35 is riveted into the center of the bottom member 11. Into this bushing 35 may be threaded an upstanding central handle 36, having a necked down portion 37 and a terminal knob 38, at the upper end thereof. The length of the handle 36 is sufficient to project above any food that would be placed in the container 10, and the entire device may be conveniently lifted out of the cooking vessel 25 by passing the tines of a cooking fork on either side of the neck 37 and under the knob 38.

In some instances, it may be desirable to dispense with the upstanding handle 36, in which case the same may be removed by unscrewing it from the bushing 35. Alternate means for then lifting the utensil 10 from the cooking vessel 25 is provided in the form illustrated in Figures 3 and 6. Here it will be seen that the bushing 35 is reduced in diameter immediately adjacent the upper surface of the bottom member 11, whereby to form a shouldered upper end of the bushing 35. An L-shaped handle 40 having an upper grip portion 49, and a V-shaped forked lower end member 41 may be engaged with the utensil 10 by passing the forked member 41 under the shoulder of stud 35, whereby to place the same in the center of the V, indicated at 42 in Figure 6.

The handle 40 is formed of sheet metal having a shank 50 with a channel cross-section, and the lower end member 41 is secured to the lower ends of the sides of the channel. The end member 41 is of a resilient material, and is split along two divergent lines 43 and 44 whereby to leave a central portion of the V that may be deformed upwardly, as shown in Figure 6.

A trigger 47 is supported for sliding movement in a pair of outstruck loops 48 in the handle 49, and the lower end of the trigger 47 is riveted to the rear of the movable V-portion 41' so that by pulling upwardly on the trigger 47, the movable V-portion 41 will be deformed upwardly, pressing snugly against the underside of the shoulder on the stud 35, whereby to clamp the entire member 41 tightly against the bottom member 11 of the utensil and permit its removal thereby. Secure engagement of the handle 40 with the utensil 10 is accomplished as long as pressure is maintained on the trigger 47, and such engagement may be released by releasing the trigger 47.

Thus, we have provided a novel utensil adaptable for use in connection with any one of a number of widely varying sizes of cooking vessel. The device shown is not only useful for cooking food, as previously described, but may also be employed for analogous uses, such for example, as the sterilizing of surgical and dental instruments, the sterilizing of nursing bottles and nipples, and a wide variety of other uses, such as will occur to persons employing the device. The novel and attractive appearance of the utensil 10 is such that it may be used as a serving dish by resting it on a platter or plate to catch any juices dripping therefrom. It may also serve as a fruit or nut bowl.

While the forms shown and described herein are fully capable of achieving the objects and providing the advantages hereinbefore stated, it will be realized that they are capable of considerable modification without departing from the spirit of the invention. For this reason, we do not mean to be limited to the forms shown and described, but rather to the scope of the appended claims.

We claim:

1. In a container of the type having a bottom and foldable wall sections, means for securing said bottom and wall sections together comprising: a substantially flat peripheral flange portion on said bottom member having at least one slot therein substantially parallel to the edge of said flange; a downwardly projecting tab on said wall section positioned in said slot; lateral shoulders in said section on opposite sides of said tab and resting on said flange portion for rocking motion of said section about an axis in said tab extending through said shoulders; and a tongue and slot connection between said flange portion and section to hold said tab in said first-mentioned slot said tongue and slot connection being positioned and adapted to engage along said axis whereby to permit free rocking of said section about said axis.

2. In a container of the type having a bottom and foldable wall sections, means for securing said bottom and wall sections together comprising: a substantially flat peripheral flange portion on said bottom member having at least one slot therein substantially parallel to the edge of said flange; a downwardly projecting tab on said wall section positioned in said slot; lateral shoulders in said section on opposite sides of said tab and resting on said flange portion for rocking motion of said section about an axis in said tab extending between said shoulders; a transverse slot in said section having an edge lying substantially on said axis; and a tongue formed in a side of said flange slot projecting into said wall section slot and engaging said edge to retain said tab in said flange slot and permit free rocking of said section about said axis.

3. In a container of the type having a bottom and foldable wall sections, means for securing said bottom and wall sections together comprising: a substantially flat peripheral flange portion on said bottom member having at least one slot therein substantially parallel to the edge of said flange; a downwardly projecting tab on said wall section positioned in said slot; lateral shoulders in said section on opposite sides of said tab and resting on said flange portion for rocking motion of said section about an axis in said tab extending between said shoulders; a transverse slot in said section substantially parallel to, and above a line drawn between said shoulders and having a lower edge substantially on said line; and a tongue formed in a side of said flange slot projecting into said wall section slot to retain said tab in said flange slot, said tongue being arched above the flat surface of said flange portion and engaging said edge to permit said rocking movement of said section.

4. An adjustable colander comprising in combination: a circular dish-shaped foraminous bottom member having a flat flange-like rim with a plurality of slots formed therein adjacent the periphery thereof, said slots being perpendicular to radii of said bottom member; a plurality of foraminous trapezoidal leaves arranged circumferentially around said rim and having the upper portions thereof curved in a horizontal and in a vertical plane whereby to form bowl-like sides for said container, having a substantially vertical top rim portion; a downwardly extending tab on each of said leaves, each of said tabs being received in one of said slots; lateral shoulders formed in each of said leaves at opposite ends of said tab, said shoulders resting on the upper surface of said rim to support said leaf for rocking movement thereof about a transverse line drawn between said shoulders; and tongue and slot connections between said rim and each of said leaves to hold said tab in said first-mentioned slot said tongue and slot engaging only along said line whereby to permit said rocking movement without substantial sliding friction between said leaves and flange respectively.

5. An adjustable colander comprising in combination: a circular dish-shaped foraminous bottom member having a flat flange-like rim with a plurality of slots formed therein adjacent the periphery thereof, said slots being perpendicular to radii of said bottom member; a plurality of foraminous trapezoidal leaves arranged circumferentially around said rim and upwardly and outwardly inclined therefrom, said leaves being mutually overlapping in the same direction around said rim and having the upper portions thereof curved in a horizontal and in a vertical plane whereby to form bowl-like sides for said container, having a substantially vertical top rim portion; a downwardly extending tab on each of said leaves, each of said tabs being received in one of said slots; lateral shoulders formed in each of said leaves at opposite ends of said tab, said shoulders resting on the upper surface of said rim to support said leaf for rocking movement thereof about a transverse line drawn between said shoulders; a transverse slot in each of said leaves substantially parallel to a line drawn between said shoulders thereon and having a lower edge substantially on said line; and a tongue formed in a side of each of said first slots projecting into said second-mentioned slot and engaging said edge to retain said tab in said first slot.

6. An adjustable colander comprising in combination: a circular dish-shaped foraminous bottom member having a flat flange-like rim with a plurality of slots formed therein adjacent the periphery thereof, said slots being perpendicular to radii of said bottom member; a plurality of foraminous trapezoidal leaves arranged circumferentially around said rim and upwardly and outwardly inclined therefrom, said leaves being mutually overlapping in the same direction around said rim and having the upper portions thereof curved in a horizontal and in a vertical plane whereby to form bowl-like sides for said container, having a substantially vertical top rim portion; a downwardly extending tab on each of said leaves, each of said tabs being received in one of said slots; lateral shoulders formed in each of said leaves at opposite ends of said tab, said shoulders resting on the upper surface of said rim to support said leaf for rocking movement thereof about a transverse line drawn between said shoulders; a transverse slot in each of said leaves substantially above a line drawn between said shoulders and having a lower edge substantially on said line; and a tongue formed in a side of each of said first slots projecting into said second slot to retain said tab in said first slot, said tongues all being arched above the top surface of said rim and engaging said edges in the respective leaves to permit said rocking movement of said leaves.

EVERETT M. MILLARD.
ALLAN L. TURNER.
HENRY M. KURZ.
MARJORIE L. DOCKERY.

References Cited in the file of this patent

UNITED STATES PATENTS

| Number | Name | Date |
|---|---|---|
| 479,207 | Edmond et al. | July 19, 1892 |
| 585,284 | Paden | June 29, 1897 |
| 889,020 | Kellogg | May 26, 1908 |
| 1,009,527 | Kellogg | Nov. 21, 1911 |
| 1,021,133 | Chaloud | Mar. 26, 1912 |
| 1,149,004 | Terry | Aug. 3, 1915 |
| 1,305,818 | McFarland | June 3, 1919 |
| 1,396,876 | Platt | Nov. 15, 1921 |
| 2,432,792 | Ovenshire | Dec. 16, 1947 |
| 2,512,287 | Schneider | June 20, 1950 |

FOREIGN PATENTS

| Number | Country | Date |
|---|---|---|
| 210,255 | Germany | May 27, 1909 |
| 348,598 | Great Britain | May 6, 1931 |
| 383,561 | Great Britain | Nov. 17, 1932 |
| 520,135 | Great Britain | Apr. 16, 1940 |
| 543,833 | France | June 10, 1922 |
| 689,280 | France | May 26, 1930 |
| 728,130 | Germany | Nov. 20, 1942 |